(12) United States Patent
Camiller

(10) Patent No.: US 9,499,134 B2
(45) Date of Patent: Nov. 22, 2016

(54) HAND-HELD CLEANING DEVICE AND VEHICLE CONFIGURED TO EQUIP THE SAME

(71) Applicant: Amber Camiller, Canton, MI (US)

(72) Inventor: Amber Camiller, Canton, MI (US)

(*) Notice: Subject to any disclaimer, the term of this patent is extended or adjusted under 35 U.S.C. 154(b) by 17 days.

(21) Appl. No.: 14/695,834

(22) Filed: Apr. 24, 2015

(65) Prior Publication Data

US 2015/0307066 A1 Oct. 29, 2015

Related U.S. Application Data

(60) Provisional application No. 61/984,288, filed on Apr. 25, 2014.

(51) Int. Cl.
| | | |
|---|---|---|
| *B60R 7/04* | (2006.01) | |
| *B60S 3/00* | (2006.01) | |
| *A47L 9/00* | (2006.01) | |
| *A47L 5/24* | (2006.01) | |
| *A47L 9/28* | (2006.01) | |

(52) U.S. Cl.
CPC .................. *B60S 3/008* (2013.01); *A47L 5/24* (2013.01); *A47L 9/0027* (2013.01); *A47L 9/0063* (2013.01); *A47L 9/2873* (2013.01); *B60R 7/04* (2013.01); *B60R 7/046* (2013.01)

(58) Field of Classification Search
CPC .......... B60S 3/008; B60R 7/04; B60R 7/046
See application file for complete search history.

(56) References Cited

U.S. PATENT DOCUMENTS

| | | | |
|---|---|---|---|
| 2,753,434 A | 7/1956 | Storm, Jr. | |
| 3,513,500 A | 5/1970 | Hori | |
| 4,488,331 A | 12/1984 | Ward | |
| D277,516 S | 2/1985 | Hayden et al. | |
| D303,856 S | 10/1989 | Yuen | |
| 5,211,131 A | 5/1993 | Plyler | |
| D527,502 S | 8/2006 | Yoshimoto et al. | |
| D543,667 S | 5/2007 | Yoshimoto et al. | |
| D575,013 S | 8/2008 | Gee, II et al. | |
| 7,841,045 B2 | 11/2010 | Shaanan et al. | |
| 8,225,456 B2 | 7/2012 | Hakan et al. | |
| 8,414,670 B2 | 4/2013 | Lee | |
| 8,595,894 B1 * | 12/2013 | Kakish | A47L 5/24 15/339 |
| 2007/0180640 A1 * | 8/2007 | Knopow | A46B 5/0025 15/210.1 |
| 2014/0157527 A1 * | 6/2014 | Corradini | A47L 13/26 8/137 |

* cited by examiner

*Primary Examiner* — Lori L Lyjak
(74) *Attorney, Agent, or Firm* — Dinsmore & Shohl LLP (57) ABSTRACT

A hand-held cleaning device for vacuuming debris is provided. The hand-held cleaning device a housing, a motor and a vacuum generator. The motor and vacuum generator are both disposed within the inner space of the housing. An intake is in fluid communication with the vacuum generator. The vacuum generator draws air through the intake so as to collect debris. A filter is disposed between the intake and an outtake so as to catch debris. The housing has an outer surface configured to be gripped by a single hand of a user and is dimensioned so as to fit within a purse or diaper bag of a user so as to be easily carried. A vehicle having a storage compartment configured to hold the hand-held device is also provided. The storage compartment may be disposed on the center console of the vehicle or the door of the vehicle.

20 Claims, 6 Drawing Sheets

FIG. 7

HAND-HELD CLEANING DEVICE AND VEHICLE CONFIGURED TO EQUIP THE SAME

CROSS-REFERENCE TO RELATED APPLICATIONS

This application claims priority of U.S. Provisional Patent Application 61/984,288 filed Apr. 25, 2014, the contents of which are incorporated herein by reference.

TECHNICAL FIELD

The present invention relates generally to a hand-held cleaning device having a housing configured to be gripped by the user. A vehicle having a storage compartment configured to hold a hand-held cleaning device is also provided.

BACKGROUND OF THE INVENTION

Hand-held cleaning devices are currently known and used. Such devices include a handle and may be connected, via an electric cord, to an outlet or may include a battery so as to allow the hand-held cleaning device to be used remote of a power source. However, such devices remain relatively large and do not easily fit within a purse or diaper bag. Thus, such devices tend to remain at home and are used within the house.

Vehicles with a vacuum cleaner are also known. However, the vacuum cleaner is fixedly mounted within the vehicle. The vacuum contains a hose which is connected at one end to the motor and vacuum generator assembly and thus the areas of the vehicle which are accessible by the vacuum are limited to the length of the hose. Further, the hose must be manipulated so as to maneuver the hose around objects within the vehicle such as the front driver and passenger seat.

Accordingly, it remains desirable to have a vacuum which is hand held and portable and dimensioned to be easily gripped by the user as well as to be stored within a purse or a diaper bag. It further remains desirable to have a vehicle equipped with a vacuum configured to access all areas within the cabin space of the vehicle to include the trunk without having to manipulate the hose.

SUMMARY OF THE INVENTION

A hand-held cleaning device for collecting debris is provided. The hand-held cleaning device includes a housing having an inner space and an outer surface. The hand-held cleaning device further includes a motor, a vacuum generator, and an intake. The motor and vacuum generator are both disposed within the inner space of the housing. The intake is in fluid communication with the vacuum generator. The vacuum generator is configured to draw air through the intake so as to collect debris. The debris is collected within the inner space of the housing. The housing has a wall which forms a generally tubular shape and is dimensioned to be gripped by a user, and easily stored within a purse or a diaper bag.

A vehicle having a storage compartment configured to hold a hand-held cleaning device is also provided. The vehicle includes a power supply and a cabin space. The storage compartment is configured to hold the hand-held cleaning device. The storage compartment is mounted within the cabin space of the vehicle. The hand-held cleaning device has a housing containing the motor and the vacuum generator. The vehicle includes a charging station. The charging station is disposed within the storage compartment and is configured to charge a battery of the hand-held cleaning device.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

DETAILED DESCRIPTION OF THE INVENTION

A hand-held cleaning device for vacuuming debris is provided. The hand-held cleaning device includes a housing having an inner space and an outer surface. The hand held device further includes a motor and a vacuum generator. The motor and vacuum generator are both disposed within the inner space of the housing. The hand-held device further includes an intake in fluid communication with the vacuum generator. The vacuum generator draws air through the intake so as to collect debris. A filter is disposed between the intake and an outtake so as to catch debris. The housing has an outer surface configured to be gripped by a single hand of a user and is dimensioned so as to fit within a purse or diaper bag of a user so as to be easily carried.

A vehicle having a storage compartment configured to hold a hand-held cleaning device is also provided. The vehicle includes a power supply, and a cabin space. A storage compartment is disposed in the vehicle. The storage compartment is configured to hold a hand-held cleaning device. The hand-held cleaning device includes a housing. A motor, a vacuum generator, and a filter are disposed within the housing. An intake and an outtake are mounted to the outer surface of the housing. The housing is dimensioned to be gripped by a single hand and seated within the storage compartment. The hand-held device further includes an inlet in electrical communication with a battery. The battery is configured to provide electrical power to the motor so as to actuate the vacuum generator wherein debris may be vacuumed. The vehicle further includes a charging station disposed within the storage compartment so as to charge the battery of the hand-held device.

Figure 1:
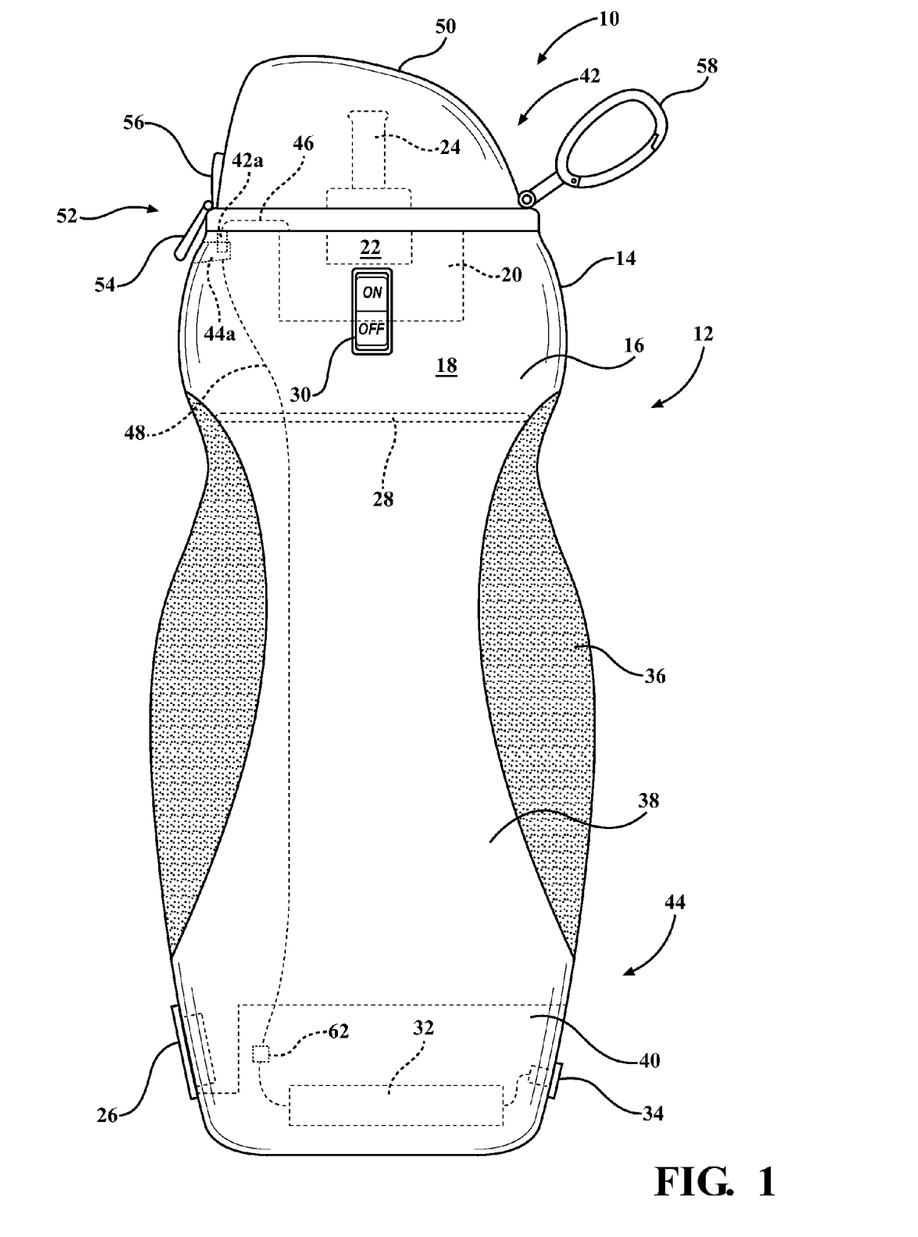
FIG. 1 is a perspective view of a hand-held cleaning device.
Figure 2:
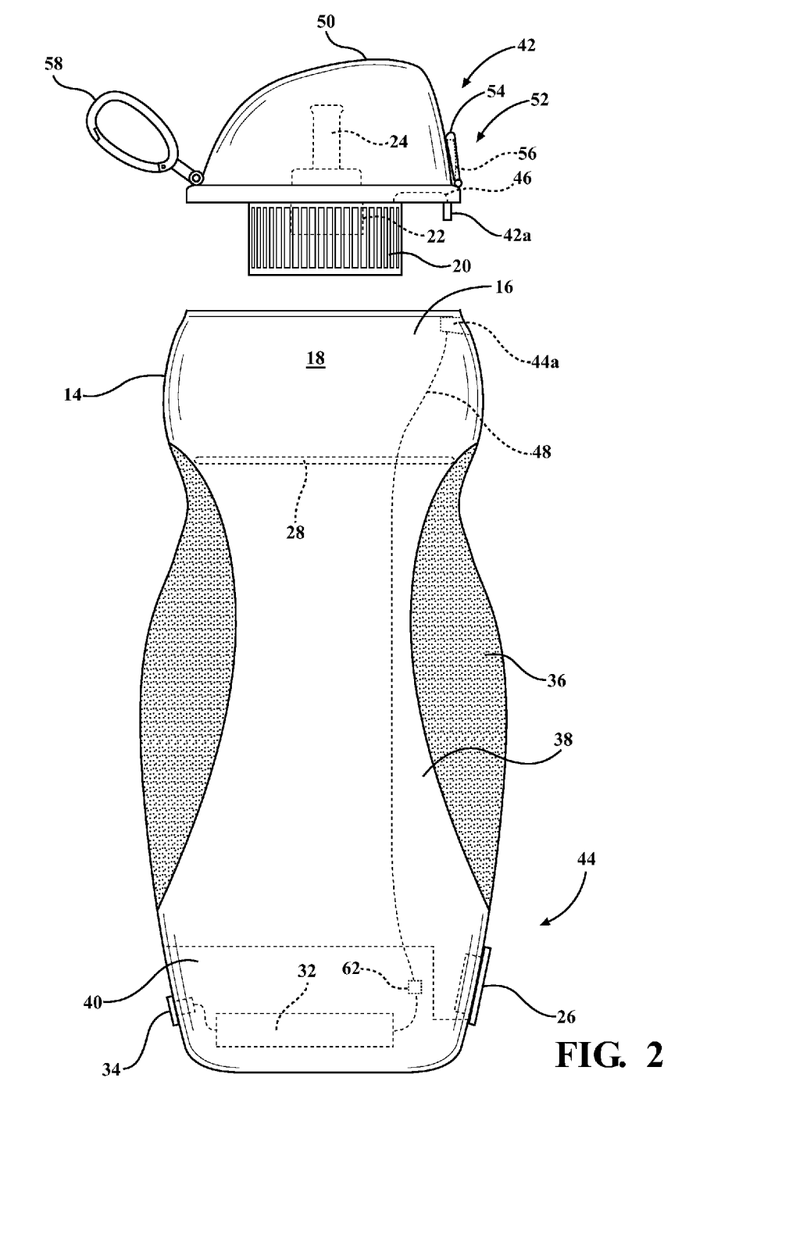
FIG. 2 is a view of the hand-held cleaning device shown in FIG. 1 with the top removed.

With reference first to FIGS. 1 and 2, an illustrative embodiment of a hand-held cleaning device 10 is provided. The hand-held cleaning device 10 includes a housing 12. The housing 12 is defined by a wall 14 forming an inner space 16. The wall 14 has an outer surface 18 which is generally continuous so as to enclose the inner space 16. The bottom portion 44 of the housing 12 may be closed. The body of the housing 12 is generally cylindrical.

The hand-held cleaning device 10 includes a motor 20 and a vacuum generator 22. The motor 20 and the vacuum generator 22 are both disposed within the inner space 16 of the housing 12. An intake 24 and an outtake 26 are in fluid communication with the vacuum generator 22. The vacuum generator is disposed between the intake 24 and the outtake 26. The vacuum generator 22 is configured to draw air through the intake 24 so as to collect debris, and draw the air out the outtake 26. A filter 28 is disposed between the intake 24 and the vacuum generator 22 so as to collect debris drawn into the housing 12 by the vacuum generator 22. The collected debris is stored within the housing 12.

The hand-held cleaning device 10 may further include a switch 30 disposed on the outer surface 18 of the housing 12. The switch 30 is configured to actuate the motor 20 so as to draw air through the intake 24. The hand-held cleaning device 10 may further include a battery 32 configured to provide power to the motor 20 so as to allow the user to operate the hand-held cleaning device 10 cordlessly. Thus, it should be appreciated that the hand-held cleaning device 10 may include an inlet 34 disposed on the outer surface 18 of the housing 12. In such an embodiment, a power cord may be utilized to provide power from a power supply, such as a utility power source or a vehicle's battery.

With reference again to FIG. 1, the wall 14 is generally tubular and is dimensioned to be gripped by the user. As shown in FIG. 1, the wall 14 may be contoured along its midsection so as to facilitate the grip of a user. However, it should be appreciated that the wall 14 may be generally uniform and having an equal diameter along the height of the wall 14 measured along a central axis. The wall 14 may be formed of a polymer suited for use in an injection molding process. The hand-held cleaning device 10 is generally the size of a water bottle. For instance, the hand-held cleaning device 10 has housing 12 having a bottom portion 44 with a diameter no greater than 3.5 inches, and a height no greater than 12 inches. Preferably the housing 12 has a diameter of approximately 3.5 inches and a height of approximately 10 inches. An outer surface 18 of the wall 14 may include a resilient pad 36 to facilitate the user's grip. The pad 36 may be formed of a resilient material such as rubber.

With reference now to FIG. 2, a view of the opposite side of the hand-held cleaning device 10 shown in FIG. 1 is provided. The inner space 16 of the housing 12 may be compartmentalized so as have a debris collection space 38 and a first storage space 40. The first storage space 40 is configured to store an attachment 60 (shown in FIG. 5) for use with the intake 24 as described below. The debris collection space 38 is defined by the dashed lines shown in FIGS. 1 and 2. The debris collection space 38 is disposed beneath the intake 24 and is in fluid communication with the intake 24. The filter 28 is disposed in the debris collection space 38. The filter 28 may be a mesh bound by a resilient ring configured to be removable secured to the inner space 16 of the housing 12.

The housing 12 may include a top 42 removably attached to a bottom portion 44 of the housing 12. The top 42 may include a first electrical lead 46, such as an insulated wire, connected to the motor 20. The first electrical lead 46 may be integrated into the top 42. The bottom portion 44 includes a second electrical lead 48 connected to the battery 32, such as an insulated wire. The second electrical lead 48 may be integrated into the bottom portion 44. The top 42 is configured to secure to the bottom portion 44 of the housing 12 so as to connect the first electrical lead 46 to the second electrical lead 48.

The switch 30 is configured to open or close electrical power from the battery 32 to the motor 20. Thus, it should be appreciated that the user may simply remove the top 42 so as to access the filter 28 for cleaning purposes, as well as to dump out debris collected within the inner space 16 of the housing 12. Upon attaching the top 42 to the bottom portion 44 of the housing 12, the first and second electrical leads 46, 48 are in contact with each other so as to provide electrical power to the motor 20. It should be appreciated that the top 42 may be configured to attach to the bottom portion 44 in a specific manner which places the first electrical lead 46 in electrical communication with the second electrical lead 48.

Figure 4:
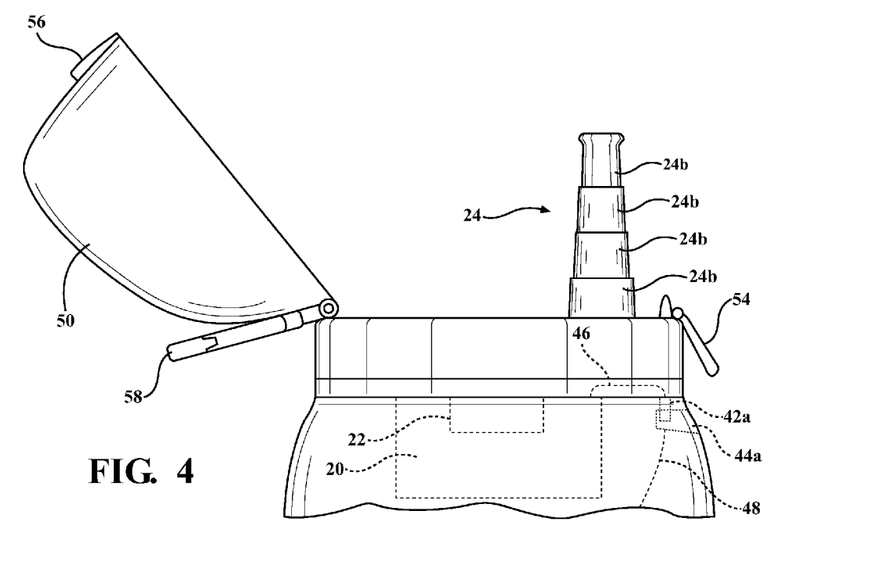
FIG. 4 is an illustrative view of a top having a telescopic intake.

For instance, the top 42 may include a threaded opening and the bottom portion may include a corresponding threaded neck, wherein tightening the top 42 to the bottom portion 44 places the first electrical lead 46 in electrical communication with the second electrical lead 48 as shown in FIG. 4. Alternatively, the top 42 may have a male member 42a configured to engage a receiving member 44a of the bottom portion 44 so as to force the top 42 to engage the bottom portion 44 in a specific location, wherein the first electrical lead 46 is in electrical communication with the second electrical lead 48, as shown in FIGS. 2 and 4.

Figure 3:
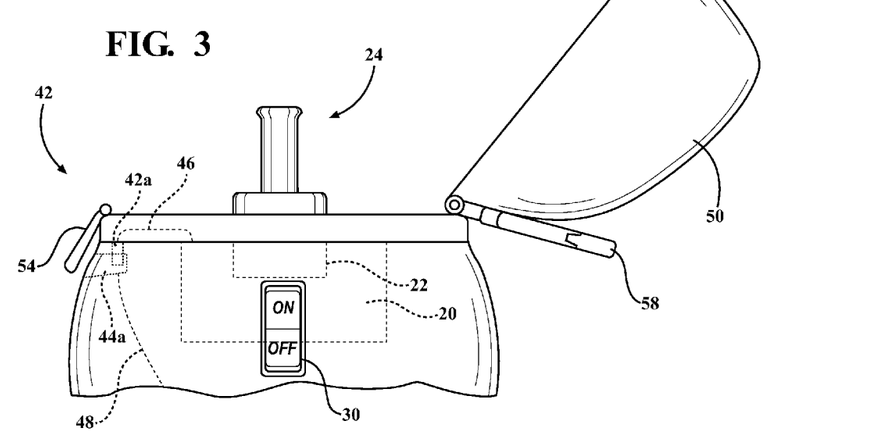
FIG. 3 is an illustrative view of a top having a rigid intake.

With reference again to FIGS. 1 and 2 and now also to FIGS. 3 and 4, the hand-held cleaning device 10 may further include a cap 50. The cap 50 is configured to cover and expose the intake 24. The cap 50 is illustratively shown as being pivotably mounted to the top 42 of the housing 12. However, it should be appreciated by those skilled in the art that the cap 50 may be screwed on to the top end of the housing 12, wherein a thread is formed on an inner surface wall of the cap and a corresponding thread is formed on an outer surface 18 the top end of the housing 12 so as to allow the cap to be screwed onto the housing 12. In another example, the cap 50 may be configured to engage an outer edge of the top 42 of the housing 12 in a snap fit manner.

The cap 50 may further include a locking assembly 52. For illustrative purposes, the locking assembly is shown as a ring 54 configured to engage a catch 56. The ring 54 is pivotably mounted to the top 42 of the housing 12. The catch 56 is formed on an exterior surface of the cap 50 and protrudes from the cap so as to receive the ring 54, thereby securing the cap 50 to the top 42. Any locking assembly 52 currently known and used in the art may be adapted for use herein illustratively including a button having a cam surface configured to position a cam rider so as to allow the locking assembly 52 to be disengaged.

With reference now to FIG. 5 and again to FIGS. 1-4, the cap 50 may further include a support clip 58. The support clip 58 may be pivotally mounted to a back side of the cap 50. The support clip 58 is configured to facilitate the attachment of the cap 50 and the housing 12 to a belt. Though the support clip 58 is shown generally as a clip commonly referenced as a carabiner clip, it should be appreciated that other types of support clips may be modified and used herein.

With reference again to FIGS. 3 and 4, an illustrative example of the intake 24 is provided. FIG. 3, shows the intake 24 being a generally cylindrical member protruding from the top 42 of the housing 12. FIG. 4 shows the intake being telescopic. The intake 24 includes a plurality of segments 24b. The segments 24b are annular and each has a radius different in length than the other wherein each segment is fitted to a respective segment so as to telescope outwardly. It should be appreciated that the dimensions of the telescopic intake 24 provided in FIG. 4 are exemplary and should not be limiting to the concept of the telescopic intake 24.

With reference again to FIG. 5, the hand-held cleaning device 10 having an alternative embodiment of the first storage space 40 is provided. The first storage space 40 is disposed in the bottom portion 44 of the housing 12. The first storage space 40 is sealed from the debris held within the debris collection space 38. The first storage space 40 is removably attached to the housing 12. For illustrative purposes, the first storage space 40 is screwed onto the bottom portion 44 of the housing 12.

Figure 5:
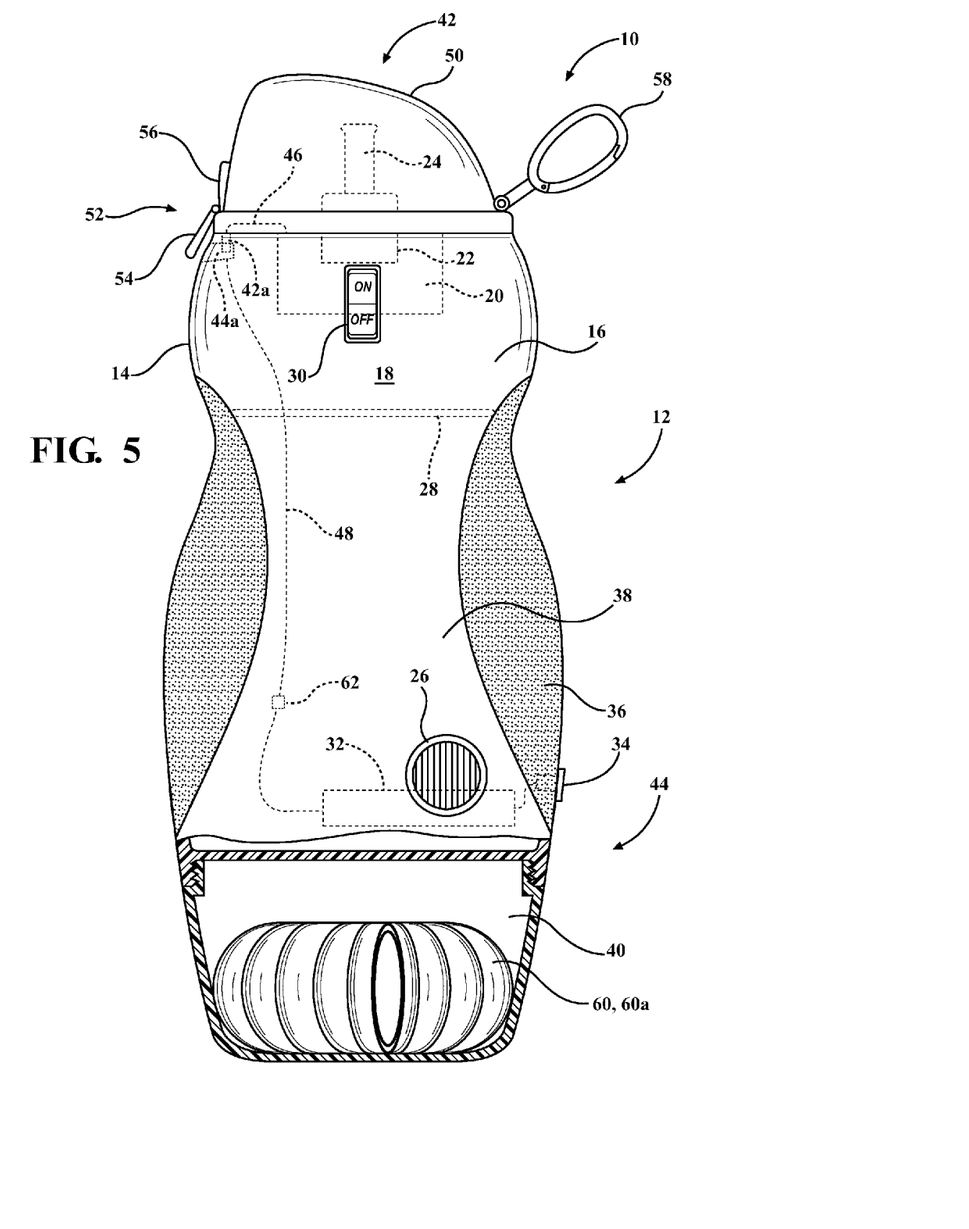
FIG. 5 is an illustration of a hand-held cleaning device with the first storage space removably mounted to the bottom portion.

The first storage space 40 is dimensioned so as to provide an attachment 60. The attachment 60 is a structure which may be coupled to the intake 24 so as to provide the intake 24, with a unique feature for collecting debris. For illustrative purposes, the attachment 60 is shown as a hose 60a coiled within the first storage space 40. The hose 60a, includes an end configured to fittingly engage the intake 24. It should be appreciated by those skilled in the art that the attachment may further include an end portion having a brush so as to help lift debris from a carpeted surface to facilitate the suction and the drawing of the debris, or an end portion which is narrowed so as to allow the hand-held cleaning device 10 access to tight corners.

Figure 6:
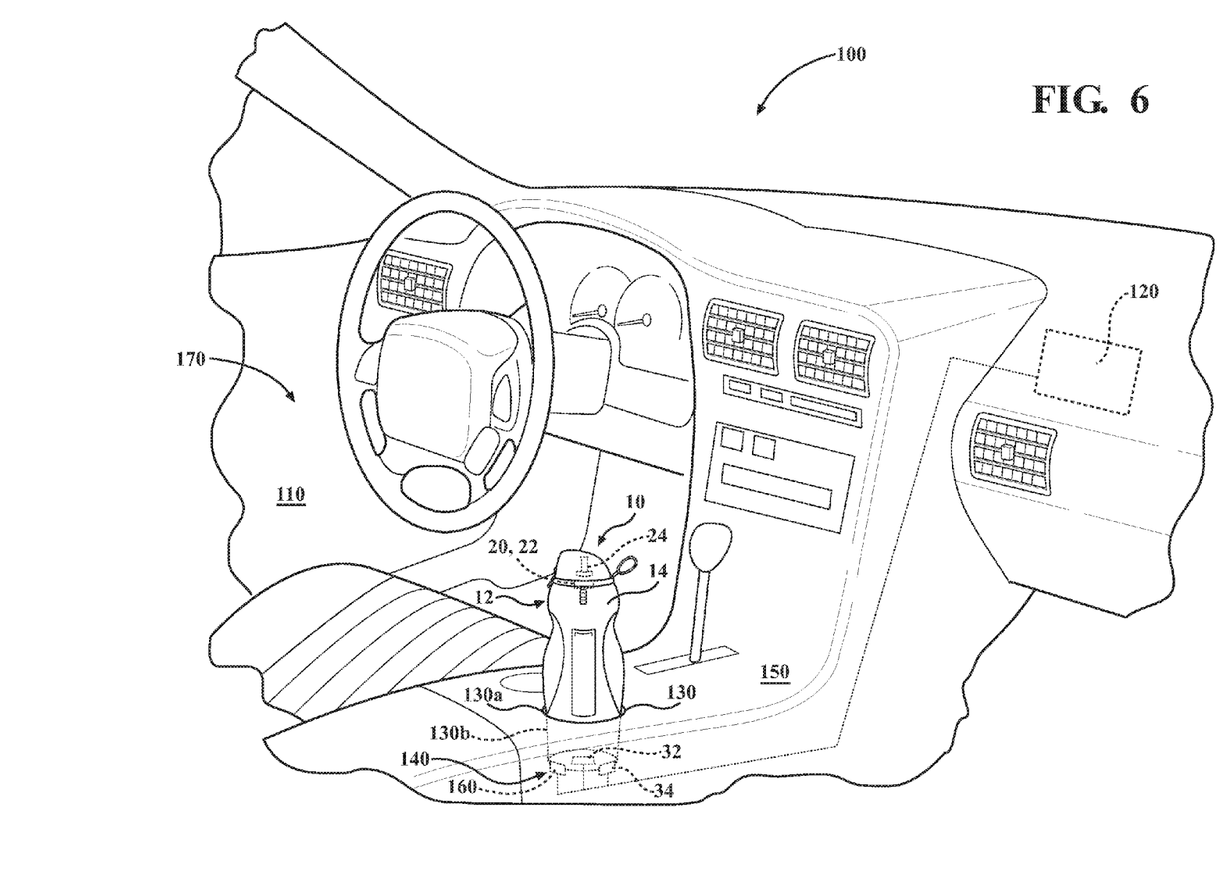
FIG. 6 is a perspective view of a vehicle equipped with a storage compartment configured to hold a hand-held cleaning device.

With reference now to FIG. 6, a vehicle 100 having a cabin space 110 and a power supply 120 is provided. The vehicle 100 includes a storage compartment 130 configured to hold a hand-held cleaning device 10 configured for picking up debris. The storage compartment 130 includes an opening 130a having a diameter configured to receive the bottom portion 44 of the hand-held cleaning device 10. An inner peripheral wall 130b of the storage compartment 130 is configured to fittingly receive the outer surface 18 of the bottom portion 44 of the hand-held device 10. The hand-held cleaning device 10 includes a housing 12 formed of a wall 14. The housing 12 contains a motor 20 and a vacuum generator 22. An intake 24 is mounted to the outer surface 18 of the housing 12.

The hand-held cleaning device 10 includes an inlet 34 in electrical communication with a battery 32. The inlet 34 may be disposed on the out surface 18 of the wall 14. The battery 32 is disposed within the housing 12 and is configured to provide electrical power to the motor 20.

The vehicle 100 includes a cabin space 110, and a charging station 140. The charging station 140 is disposed within the storage compartment 130 of the vehicle 100. The charging station 140 is in electrical communication with the power supply 120 of the vehicle 100.

Figure 7:
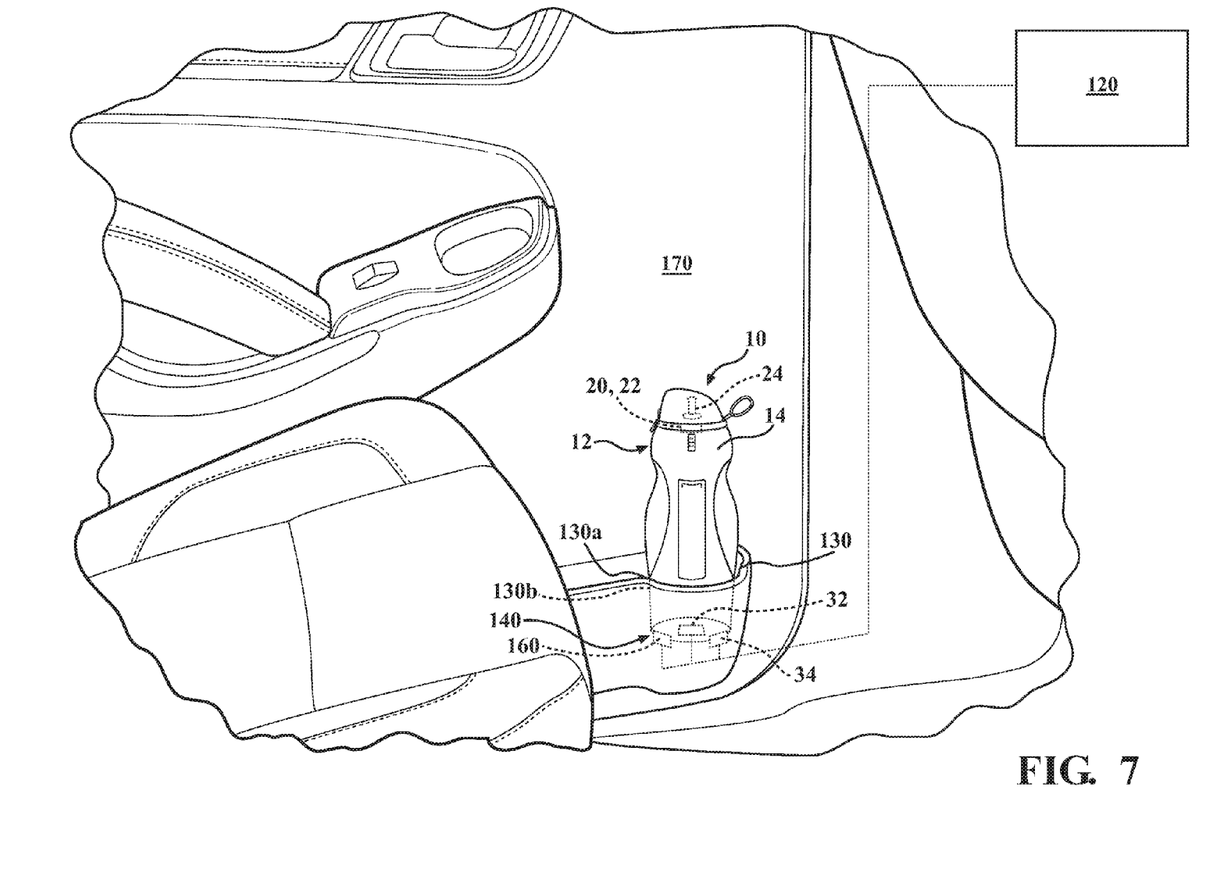
FIG. 7, is a perspective view of a vehicle wherein the storage compartment is disposed on the door of the vehicle.

An illustrative example of the location of the storage compartment 130 is shown in FIG. 6 wherein the storage compartment 130 is formed on a center console assembly 150 of the vehicle 100. However, it should be appreciated that the storage compartment 130 may be located elsewhere within the cabin space 110. For instance, FIG. 7 shows the storage compartment 130 disposed on the door 170 of the vehicle 100. The storage compartment 130 is generally tubular and is dimensioned to fittingly receive the outer surface 18 wall 14 of the hand-held cleaning device 10 disclosed above.

In one embodiment the charging station 140 is an inductive charging pad 160 configured to provide an inductive charge to the battery 32 and the hand-held cleaning device 10 is equipped with electronic circuitry 62 (shown in FIGS. 1, 2 and 5) configured to receive inductive power from the inductive charging pad 150 so as to charge the battery 32.

In another embodiment, the housing 12 includes an electrical inlet 34 configured to receive a power cord (not shown) adapted to connect to the power supply 120 of the vehicle 100 is provided. For instance, the power cord may have an end member configured to fit within a cigarette lighter of the vehicle 100. The opposite end may be a male prong configured to plug into the inlet 34 of the hand-held cleaning device 10 so as to charge the battery 32. It should be appreciated that when sufficient power is stored within the battery 32 the hand-held cleaning device 10 may be decoupled with respect to the power cord and may be used within the cabin space 110 of the vehicle 100 to clean up debris, or carried outside of the vehicle 100 for use.

It should also be appreciated that as the hand-held cleaning device 10 is generally the size of a water bottle so as to be easily stored in a diaper bag or a purse and taken outside of the vehicle 100 and easily accessed and used. For instance, when dining at a restaurant with a child, the child in some instances may make a mess which the user can easily clean up with the hand-held cleaning device 10 described herein.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination.

The invention claimed is:

1. A hand-held cleaning device for collecting debris, the hand-held cleaning device comprising:
 a housing having an inner space and an outer surface;
 a motor, a vacuum generator and a battery, the motor and the vacuum generator are both disposed within the inner space of the housing, the battery supplying power to the motor, the motor actuating the vacuum generator;
 an intake and an outtake, the intake in fluid communication with the vacuum generator, the vacuum generator drawing air through the intake and out the outtakes so as to draw debris into the housing;
 a filter configured to filter the debris; and
 wherein the housing is dimensioned so as to be gripped by a user.

2. The hand-held cleaning device as set forth in claim 1, wherein a bottom portion of the housing has a diameter no greater than 3.5 inches, and a height no greater than 12 inches.

3. The hand-held cleaning device as set forth in claim 2 wherein the inner space of the housing is compartmentalized so as have a debris collection space and a first storage space, the debris collection space in fluid communication with the intake.

4. The hand-held cleaning device as set forth in claim 3, wherein the housing includes a top and a bottom portion, the top removably attached to the bottom portion.

5. The hand-held cleaning device as set forth in claim 4, the top includes a first electrical lead in electrical communication with the motor and the bottom portion includes a second electrical lead in electrical communication with the battery, wherein the first electrical lead is in electrical communication with the second electrical lead when the top is properly secured to the bottom portion.

6. The hand-held cleaning device as set forth in claim 1, further including a cap, the cap is pivotably mounted to the housing so as to cover and expose the intake.

7. The hand-held cleaning device as set forth in claim 1, further including a locking assembly, the locking assembly configured to lock the cap with respect to the housing so as to enclose the intake.

8. The hand-held cleaning device as set forth in claim 3, further including a support clip pivotably mounted to the cap.

9. The hand-held cleaning device as set forth in 1, wherein the intake includes a plurality of segments, each of the plurality of segments is annular and each of the plurality of segments has a radius different in length than the other, wherein the plurality of segments are fitted together so as to telescope outwardly.

10. The hand-held cleaning device as set forth in claim 4, wherein the first storage space is disposed in the bottom portion of the housing, the first storage space is sealed from the debris held within the debris collection space, the first storage space removably attached to the housing.

11. The hand-held cleaning device as set forth in claim 10, further including an attachment configured to be coupled with the intake so as to facilitate vacuuming debris, the attachment stored within the first storage space.

12. The hand-held cleaning device as set forth in claim 11, wherein the first storage space is screwed onto the bottom portion of the housing.

13. The hand-held cleaning device as set forth in claim 12, wherein the attachment is a hose.

14. A vehicle having a power supply, and a cabin space, the vehicle comprising:
a storage compartment configured to hold a hand-held cleaning device, hand-held cleaning device having a housing, the housing having an inner space and an outer surface, the housing further including a motor, a vacuum generator, a battery and an inlet, the motor and the vacuum generator are both disposed within the inner space of the housing, the battery supplying power to the motor, the inlet configured to supply electrical power to the battery, the motor actuating the vacuum generator, the hand-held cleaning device further including an intake, an outtake, and a filter, the intake in fluid communication with the vacuum generator, the vacuum generator drawing air through the intake and out the outtakes so as to draw debris into the housing, the filter configured to catch debris; and
a charging station configured to engage the inlet of the hand-held cleaning device, the charging station disposed within the storage compartment, the charging station receiving an electric charge from the power supply so as to charge the battery.

15. The vehicle as set forth in claim 14, wherein the storage compartment is disposed within a center console of the vehicle.

16. The vehicle as set forth in claim 15, wherein the charging station is an inductive charging pad configured to provide an inductive charge to the battery.

17. A vehicle having a power supply, and a cabin space, the vehicle comprising:
a storage compartment configured to hold the hand-held cleaning device as set forth in claim 1, the hand-held cleaning device further including an inlet configured to provide electrical power to the battery,
a charging station configured to engage the inlet of the hand-held cleaning device, the charging station disposed within the storage compartment, the charging station receiving an electric charge from the power supply so as to charge the battery.

18. The vehicle as set forth in claim 17, wherein the storage compartment is disposed within a center console of the vehicle.

19. The vehicle as set forth in claim 17, wherein the storage compartment is disposed on a door of the vehicle.

20. The vehicle as set forth in claim 17, wherein the charging station is an inductive charging pad configured to provide an inductive charge to the battery.

* * * * *